H. R. SLATER.
FILE MILLING CUTTER.
APPLICATION FILED MAY 13, 1921.
1,433,306.
Patented Oct. 24, 1922.
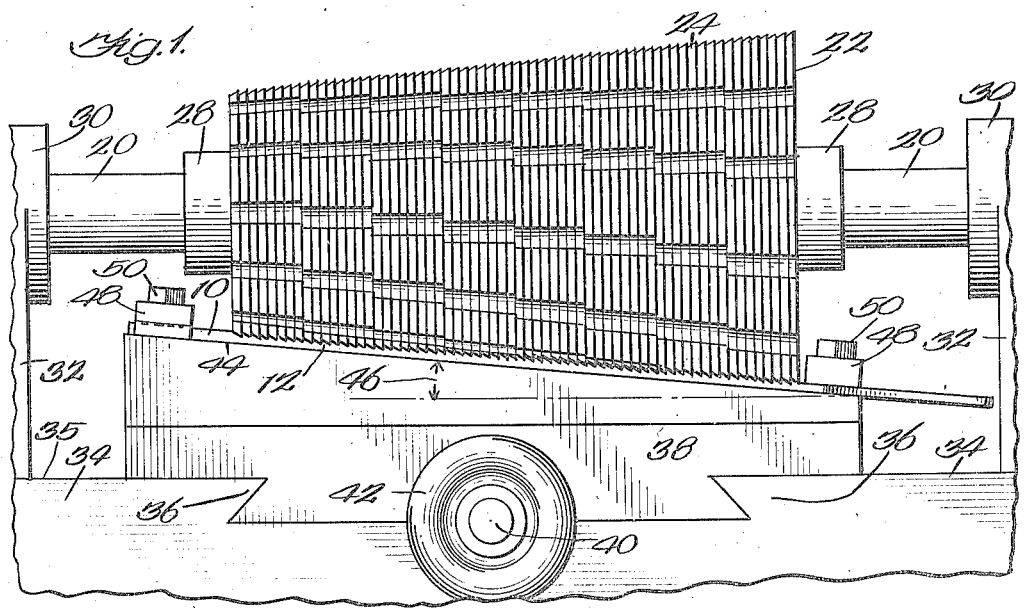
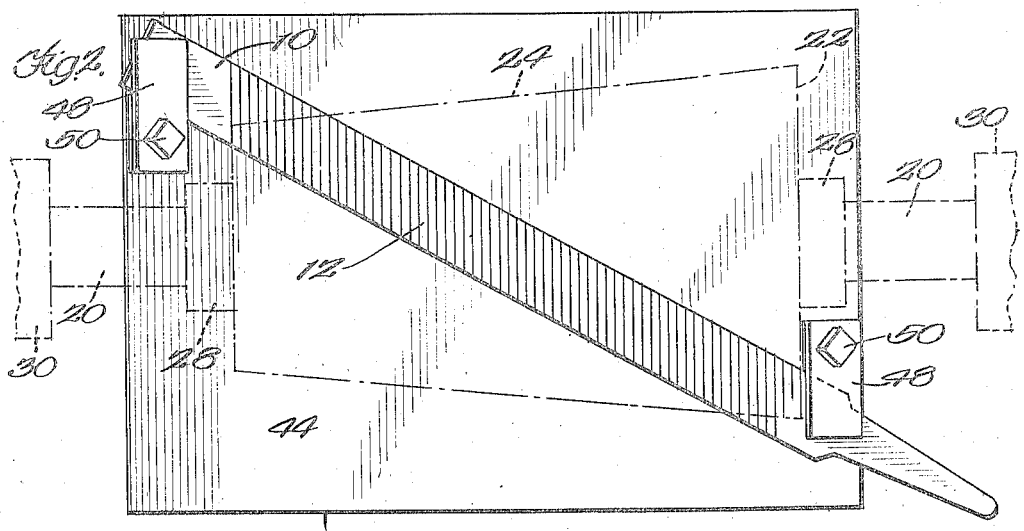
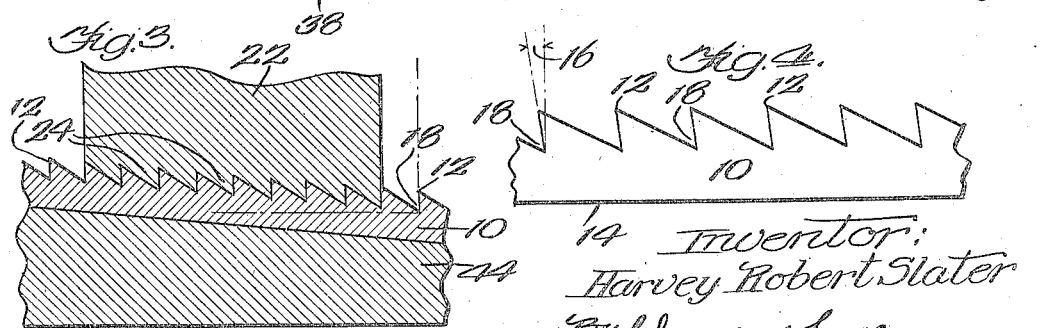
Inventor:
Harvey Robert Slater
By Cheever & Cox Attys Patented Oct. 24, 1922.

1,433,306

UNITED STATES PATENT OFFICE.

HARVEY ROBERT SLATER, OF CHICAGO, ILLINOIS.

FILE-MILLING CUTTER.

Application filed May 13, 1921. Serial No. 469,098.

*To all whom it may concern:*

Be it known that I, HARVEY ROBERT SLATER, a citizen of the United States, residing at Chicago, in the county of Cook and State of Illinois, have invented a certain new and useful Improvement in File-Milling Cutters, of which the following is a specification.

This invention relates to the manufacture of files. The object of the invention is to provide a machine by which the necessary undercut file teeth may be formed upon an ordinary file by the use of a rotating cutter, thereby making a better and more satisfactory file and doing it more cheaply than is possible by methods heretofore used, such for instance as the use of a shaper.

The invention consists in mechanism capable of attaining the foregoing objects which can be easily and cheaply made, which is satisfactory in use, and is not readily liable to get out of order. The invention further consists in many features and details of construction hereafter more fully set forth in the specification and claims.

Referring to the drawings in which like numerals denote like parts throughout the several views, Figure 1 is a side elevation of a complete machine illustrating this invention in its preferred form.

Figure 2 is a plan view of the work carrier of Figure 1 showing the position and one method of attaching the file thereto.

Figure 3 is a vertical section through a portion of the cutting tool, file and work carrier assembled as in Figure 1.

Figure 4 is a fragmentary section through a file which this machine is capable of producing.

The ordinary commercial file, a sample of which is shown in the drawing, is a rectangular strip or blank of metal 10 very much thinner in one direction than in the other, and provided on one or both of the faces with diagonally disposed teeth 12, undercut with reference to the base line 14 at a proper angle 16 as indicated in Figure 4.

When undercut file notches 18 are cut from the blank with a rotary or milling cutter which absolutely cuts off and carries away the material initially in said notch spaces, a very much more accurate and consequently better file is produced than is possible where the teeth are formed by the action of a scraping or tearing tool such as the conventional "sh"ᵢₑr." The improved file cutting mechanism which produces this desirable result includes the shaft 20 rotatable by any suitable means not shown in the drawing. On this shaft is mounted a rotatable cutting tool 22 of conical form, in the particular case here illustrated, of truncated conical form. This cutting tool or wheel is provided with circumferentially parallel cutting teeth 24 of substantially the same width corresponding to the file teeth 12 to be formed. In the practical form of construction shown in Figure 1 this cutting tool 22 is made up of a plurality of laminated disks held in place on the shaft 20 by any suitable means as for instance collars 28, but the details of the construction of the cutting wheel are immaterial and do not enter into this invention. The shaft 20 is rotatably mounted in suitable bearings 30 carried by standards 32 rising vertically from a suitably supported main base 34 having an upper surface 35 at right angles to a plane through the shaft 20, the standards 32 and the base so that a moving plane object traveling over the base transversely of the shaft and initially contacting the cutting wheel 22, will in all positions of movement continue to contact that wheel until said plane object is passed entirely out of reach of the wheel.

For convenience, the shaft 20 is described as horizontal, standards 32 as vertical, and so forth, but obviously the entire machine may be placed at any angle thus distorting its relationship between vertical and horizontal without departing from this invention. Formed in this base 34 and extending across the axis of shaft 20 is a guiding track 36 in which is reciprocatably mounted a carriage 38 adapted to be moved by any suitable means as for instance the conventional shaft 40 and hand wheel 42 in a plane parallel to the upper surface 35 of the base 34.

Suitably mounted on this carriage 38 is a work carrying block having an upper plane surface 44 inclined in a plane through the axis of the shaft 20 at an angle to the shaft 20 corresponding to the angularity of the conical surface of the cutting wheel 22, but otherwise parallel with the upper surface 35 of the base 34 with the result that as the wheel 42 and shaft 40 move the carrier 38 transversely of the shaft, an object placed on the upper surface 44 and in contact with the cutting wheel 22 will remain in contact with that wheel until the carrier has carried such object entirely beyond the reach of the wheel.

The angularity of the shaft and this upper surface 44 of the tool carriage 38 with reference to each other is measured by angle 46 which is exactly equal to the angle 16 which indicates the undercut of the file tooth 12.

Angularly disposed at opposite corners of the surface 44 are suitable securing devices for a file blank so that such file blank may be attached to this surface 44 in a position angular to the axis of the shaft and angular to the path of travel of the carriage corresponding to the desired angularity of the teeth 12 on the file to be formed. In the particular case here illustrated such securing devices take the form of clips 48 and bolts 50.

In the complete operation of the device, the operator first places the file 10 on the upper surface 44 of the carrier 38 in substantially the position of Figure 2, as indicated, and then tightens up the clips 48. He then starts shaft 20 to cause cutting tool 22 to rotate and by manipulating handle 42 causes the carrier 38 and attached parts to move along tracks 36 until the file body 10 is moved from one side of cutting tool 22 to the other. In so doing the teeth 24 form the proper file undercut teeth 12 therein. When this is completed, the operator has only to release clips 48 and remove the completely cut file.

Having thus described my invention, what I claim as new and desire to secure by Letters Patent, is:

1. In a machine of the class described, a rotary conical file cutting tool, means positioning a file blank diagonally in two directions to the axis of the cutting tool and means for then moving one of said members with reference to the other in such manner that the tool cuts undercut teeth in the file blank.

2. In a machine for the purpose described, a rotatable conical cutting tool having about its circumference file cutting teeth, a carrier member movable transversely of the axis of said cutting tool and having a work carrying surface of the same degree of angularity to the shaft as the cutting tool but oppositely disposed with reference to the cutting tool so as to make substantially a line contact with the tool along its length, means for securing a file blank to be cut on the surface of the tool carrier at an angle to the direction of movement of said tool carrier and to the axis of the cutting tool, and means for moving the carrier, for the purposes set forth.

3. In mechanism of the class described, a base having a track in which a tool carrier may reciprocate in one direction, a tool carrier so reciprocatable over the base, means for so reciprocating the tool carrier, a rotatable shaft mounted at a distance from and transversely to the path of said tool carrier, a work carrying face on said tool carrier angular to the shaft in a plane through the axis of the shaft and otherwise parallel to its own path of travel as the carrier moves, means securing a file blank on said surface at an angle diagonal to the axis of the shaft, and a conical file cutting tool carried by the shaft of the same angularity to the shaft as that of the upper surface of the file carrier adapted to contact a file blank on the carrier and as the file blank is moved across the cutting tool to undercut angularly disposed teeth in the file blank.

4. In a machine for the purpose described, a rotatable conical cutting wheel having about its circumference cutting teeth conforming to the angularity of the file teeth to be formed, a carrier member capable of movement transversely of the axis of said cutting tool and having a work carrying surface disposed in one direction at an angle to the shaft corresponding to the angularity of the cutting tool with reference to the shaft, and means for securing a file blank to be cut on the surface of the tool carrier at an angle to the direction of motion of said tool carrier and to the axis of the shaft whereby moving the tool carrier bodily under the cutter mechanism causes it to cut undercut file teeth in the file blank, for the purposes set forth.

5. In mechanism of the class described, a rotatable file cutting tool of conical form, an angular faced work carrier, substantially contacting the face of cutting tool and movable tangentially thereof in a direction parallel to the axis of the cutting tool and means for securing a file blank to the carrier at an angle to its direction of motion on the carrier and to the axis of the cutting tool whereby it will be cut by said tool as the carrier is moved.

6. In mechanism of the class described, a base, a shaft parallel thereto, a conical file cutting tool carried by said shaft, a base having a plain upper surface reciprocatable transversely of the shaft in proximity to, but without engagement with said file cutting tool, and inclined to correspond to the angularity of the file cutting tool, and means for securing the file blank on said tool carrying surface at an angle to the axis of the file cutting tool, for the purposes set forth.

In witness whereof, I have hereunto subscribed my name in the presence of two witnesses.

HARVEY ROBERT SLATER.

Witnesses:
VELMA GRIFFITH,
DWIGHT B. CHEEVER.